US007789525B2

(12) United States Patent
Vinther

(10) Patent No.: US 7,789,525 B2
(45) Date of Patent: Sep. 7, 2010

(54) POWER MODULE DRAWER

(75) Inventor: Thomas Vinther, Beder (DK)

(73) Assignee: Martin Professional A/S, Aarhus N (DK)

( * ) Notice: Subject to any disclaimer, the term of this patent is extended or adjusted under 35 U.S.C. 154(b) by 0 days.

(21) Appl. No.: 12/499,558

(22) Filed: Jul. 8, 2009

(65) Prior Publication Data

US 2010/0008080 A1 Jan. 14, 2010

(30) Foreign Application Priority Data

Jul. 14, 2008 (DK) .............................. 2008 00986

(51) Int. Cl.

| | |
|---|---|
| ***F21L 4/00*** | (2006.01) |
| ***F21V 33/00*** | (2006.01) |
| ***F21V 21/28*** | (2006.01) |
| ***H01R 33/00*** | (2006.01) |
| ***B60Q 1/06*** | (2006.01) |
| ***G03B 21/30*** | (2006.01) |
| ***F21S 8/00*** | (2006.01) |

(52) U.S. Cl. ......................... 362/190; 362/85; 362/275; 362/646; 362/371; 362/426; 362/428; 353/72

(58) Field of Classification Search ................. 362/190, 362/275, 85, 371, 646, 426–428; 353/72
See application file for complete search history.

(56) References Cited

U.S. PATENT DOCUMENTS 4,164,784 A * 8/1979 Jaksich ....................... 362/282
4,674,015 A * 6/1987 Smith ......................... 362/221
4,701,833 A * 10/1987 Bornhorst .................... 362/294
5,136,493 A * 8/1992 Straus et al. ................ 362/373
5,640,061 A * 6/1997 Bornhorst et al. ........... 307/150
6,290,375 B1 * 9/2001 LeVasseur .................. 362/368
6,866,402 B2 * 3/2005 Belliveau ..................... 362/272
6,926,427 B2 * 8/2005 Tawil et al. ................. 362/321
6,964,503 B2 * 11/2005 Smith et al. ................. 362/371
6,969,181 B1 * 11/2005 Bailey et al. ................ 362/364
7,172,316 B2 * 2/2007 Duarte et al. ............... 362/265

FOREIGN PATENT DOCUMENTS

EP 0 652 689 A2 5/1995

* cited by examiner

*Primary Examiner*—Jacob Y Choi
*Assistant Examiner*—David J Makiya
(74) *Attorney, Agent, or Firm*—Roberts Mlotkowski Safran & Cole, P.C.; David S. Safran

(57) ABSTRACT

A light fixture comprising a head, which head with at least one light source, which head is carried rotatably in a yoke, which yoke rotates in relation to a base, which bases comprises bearings for the yoke, which base has at least a power module, which power module has at least one ballast circuit, which base has at least one controller. By the base having at least one drawer in which at least the power module is located, a fast exchange of the power module in a light source in situations of changing technical specifications of the power module can be achieved very easily. This can be important in a light fixture placed high above the ground if it needs to have an electronic module exchanged.

9 Claims, 3 Drawing Sheets

POWER MODULE DRAWER

FIELD OF THE INVENTION

The present invention relates to a light fixture comprising a head, which head comprises at least one light source, which head is carried rotatably in a yoke, which yoke rotates in relation to a base, which bases comprises bearings for the yoke, which base comprises at least a power module, which power module comprises at least one ballast circuit, which base comprises at least one controller.

BACKGROUND OF THE INVENTION

It is well-known to place the power supply and ballast for moving head light fixtures in the base because in the base the heating influence of the light source is reduced because of the actual distance and the shielding of the light source.

US 20080062692 relates to moving head projectors comprising a base, to which base a yoke is rotationally connected, which yoke is rotationally connected to a head, which head comprises a light source placed partly inside reflective means, which reflective means forms a light beam, which light beam passes through light forming means, which light beam furthermore passes through at least one lens before the light beam leaves the projector.

OBJECT OF THE INVENTION

It is the object of the invention to achieve a fast exchange of a power module in a light source in situations of changing technical specifications of the power module. A further object of the invention is to achieve a fast exchange of a controller. A third object of the invention is to achieve a fast replacement of power module or controller in failure situations.

DESCRIPTION OF THE INVENTION

The objects described above can be achieved by a light fixture as described herein if the base comprises at least one drawer, which drawer can comprise at least one electronic module.

Hereby it can be achieved that the module can be exchanged very easily. This can be important in a light fixture placed high above the ground if it needs to have an electronic module exchanged. That can be important if specifications are changed after the light fixture has been placed in a thuss for operation. In situations where a failure occurs it can be very important that a repair can be made simply by changing a drawer. Also in relation to logistics, the easy exchange of the drawer can be important for a fast configuration directed to a special purpose.

The drawer can be U-shaped and placed partly around the bearing for the yoke. By forming the drawer U-shaped most of the space in a base can be used for electronics in the drawer. Only a volume in the base behind the bearing can not be used for the drawer.

In a possible embodiment for the invention the drawer can comprise at least a power module for the light fixture. In this way the power module can be exchanged in a very fast manner.

Cooling means at least for cooling the power module can be placed in the drawer. The cooling can be made by a blower placed at the outer end of the drawer for blowing air into the drawer.

The drawer can also comprise the ballast. Because the ballast is connected to one of the outlets of the power module, the ballast can be placed close to the power module.

The drawer can also comprise at least one controller. In this way, the controller for controlling mostly all functions of the light fixture can be placed in the bases far away from the heat generating light source.

The drawer can be connected electrically to the base by power connectors for power input, which base and drawer can comprise related connectors for light source connection, which base and drawer can comprise related connectors for communication signals, which connectors in the base and drawer can be released automatically by pulling out the drawer. Hereby it can be achieved automatic disconnection of all connectors when the drawer is released. In order to protect the connectors, power must be switched on before disconnecting the power module. This disconnection can be made by means of a safety switch that automatic switch of the power module before the drawer can be removed.

The base can comprise at least a first and a second drawer, which drawers are separated, which first drawer can comprise at least the power module and the ballast, which second drawer can comprise at least the controller. In this way independent exchange of power module and controller module is rendered possible. In many situations the controller must be changed because change in specifications for the light fixture needs both a hardware and software update. If a hardware update is needed, the fast exchange of the second drawer makes that exchange very effective.

DETAILED DESCRIPTION OF THE INVENTION

Figure 1:
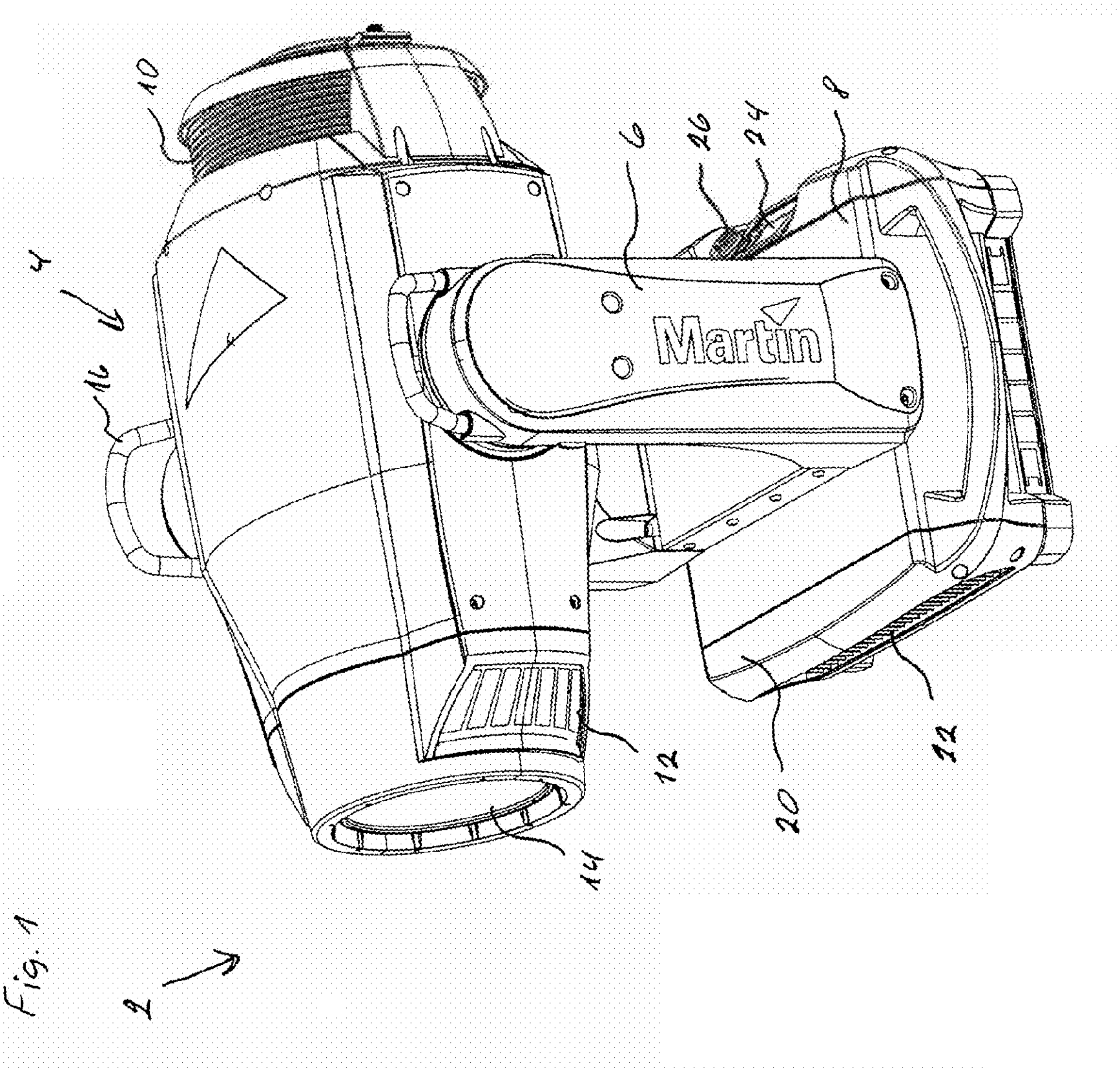
FIG. 1 show a moving head lighting fixture.

FIG. 1 show a moving head lighting fixture 2 comprising a head 4 which head 4 is carried in a yoke 6 which yoke is rotatably connected to a base 8. The head 4 comprises a light source housing 10 with cooling means, air inlet openings 12, a lense 14 and a handle 16. The base 8 comprises a drawer 20 which drawer 20 comprises ventilation openings 22 for outlet of cooling air which base 8 at the other end comprises a display 24 and a yoke wheel 26. As known, moving head lighting fixtures are automated lights, also known as luminaries, which control commands are used to change various aspects of their optics as well as movement of the light head in various manners; see, e.g., “Intelligent lighting—Wikipedia, the free encyclopedia.”

The drawer 20 comprises an integrated power module and also a processor for controlling the whole moving head light fixture 2. Both power supply and ballast for the light source and the internal processor is placed in the drawer 20. This drawer 20 can easily be pulled out and replaced with a new drawer. This is very important in case new specifications for power supply or for ballast or perhaps a new processor is necessary for operating the light fixture. Also in a situation where failure occurs in one of the modules in the drawer, it is very easy to replace the drawer. The drawer 20 is connected electrically with connectors to the base 6 and the processor is connected to the display 24 and the yoke wheel 26.

Figure 2:
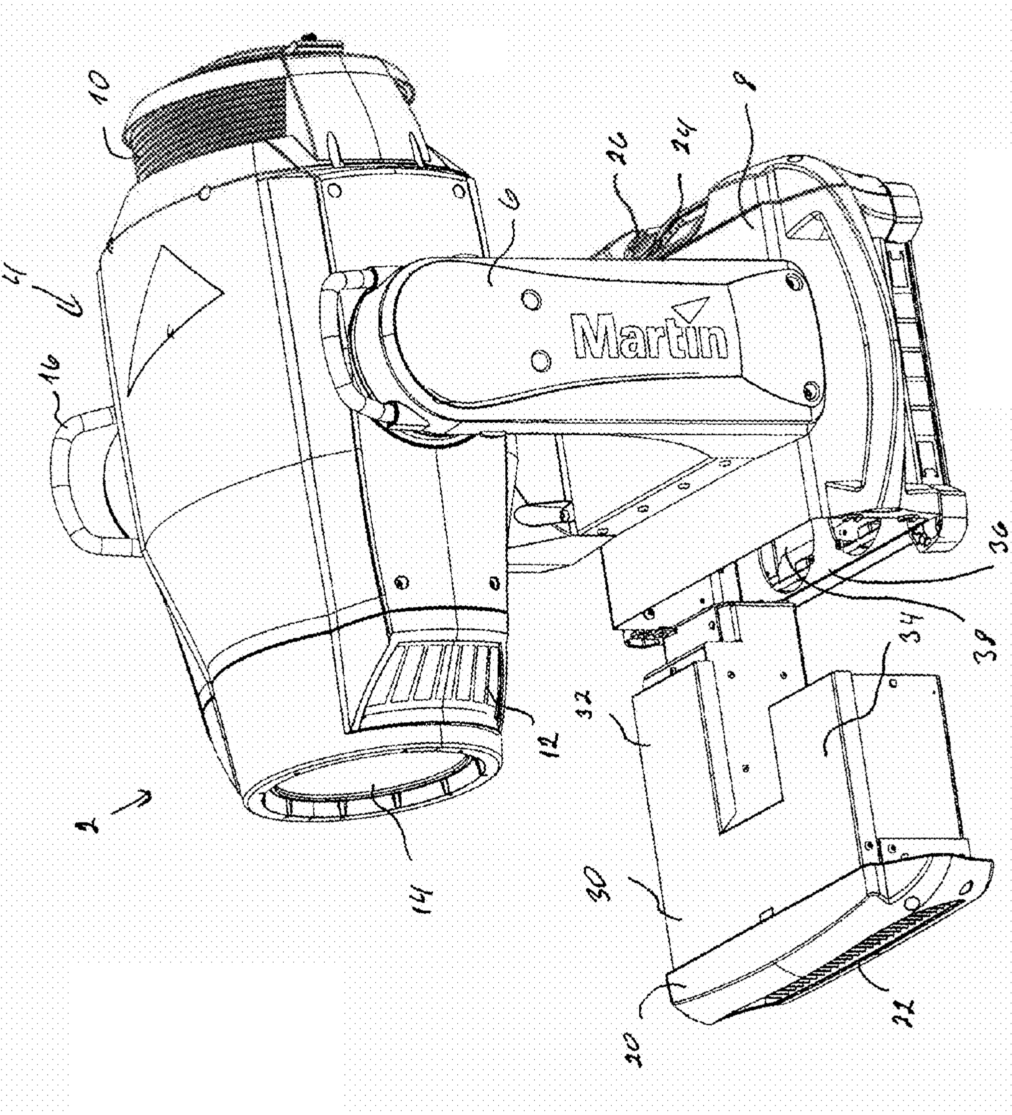
FIG. 2 shows the same moving head lighting fixture but with a open drawer.

FIG. 2 shows the same moving head lighting fixture 2 where the same numbering is used as in the FIG. 1. The difference from FIG. 1 is that the drawer 20 is now pulled out of the base 8. The drawer 20 comprises a housing 30 which is formed of two sections 32 and 34 which at the front end is interconnected. The drawer 20 is supported at the floor 36 in the base 8 and this floor comprises openings 38 for cooling air. The drawer 20 comprises it own blowing means for cooling as well as power supply or ballast and computer means.

Figure 3:
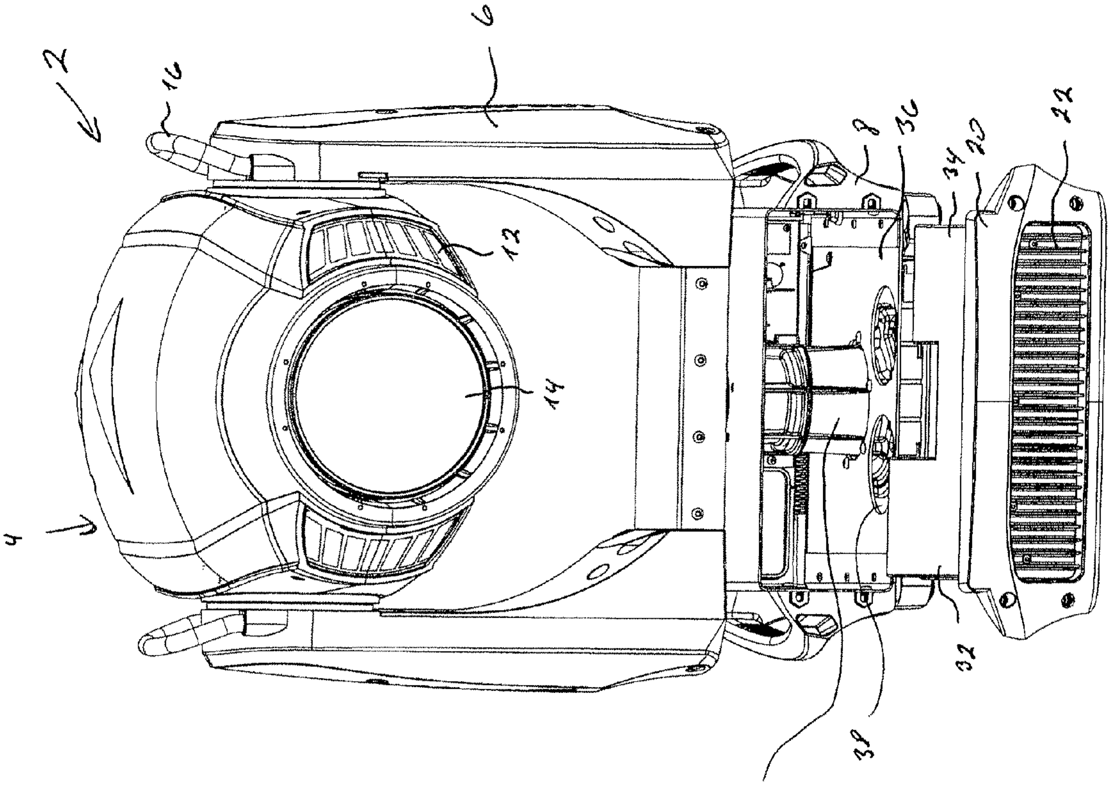
FIG. 3 shows the same moving head lighting fixture 2 as shown at FIG. 1 and FIG. 2 but seen from the front.

FIG. 3 shows the same moving head lighting fixture 2 as shown at FIG. 1 and FIG. 2. Identical numbering is used and the only differences will be described.

The moving head light fixture 2 is seen from the front and the drawer 20 is pulled out of the base 8.

The base 20 comprises the two previously mentioned sections 32 and 34 and again is seen the floor 36 and openings 38 for cooling air. Further, is seen a bearing 40 for carrying the yoke 6. The two sections 32 and 34 of the drawer 20 are formed in such a way that, between them, is an open space giving room for the bearing 40.

The inventoin claimed is:

1. A moving head light fixture, comprising: a base containing at least a power module with at least one ballast circuit, a yoke that is rotatably connected to said base via bearings, a head with at least one light source, the head being mounted to rotate in said yoke, and at least one controller for controlling all functions of the light fixture including operation of the light source and movement of the head, wherein the base comprises at least one drawer, at least said power module being provided in said drawer; and wherein said drawer comprises a housing which is formed of two lateral spaced apart sections which are interconnected at a front end of the drawer with an open space being formed between the sections in a manner providing room for said bearings such that when the drawer is inserted in the base, the bearing is located in the open space between the two lateral spaced apart sections.

2. The moving head light fixture according to claim 1, wherein the power module and the ballast are located in one of said sections and at least the controller is located in the other of said sections.

3. The moving head light fixture according to claim 2, wherein at least one cooling opening is located in a bottom wall of the base at least partially in alignment with said open space.

4. The moving head light fixture according to claim 1, wherein at least one cooling opening is located in a bottom wall of the base at least partially in alignment with said open space.

5. A moving head lighting fixture according to claim 1, wherein the drawer comprises cooling means at least for cooling the power module.

6. A moving head lighting fixture according to claim 1, wherein the drawer comprises the ballast.

7. A moving head lighting fixture according to claim 1, wherein the drawer comprises at least one controller.

8. A moving head lighting fixture according to claim 1, wherein the drawer is electrically connected to the base by power connectors for power input, which base and drawer comprises related connectors for light source connection, which base and drawer comprises related connectors for communication signals.

9. A moving head lighting fixture according to claim 8, wherein the connectors in the base and drawer are automatic releases by pulling out the drawer.

* * * * *